Nov. 4, 1924.  
A. WEIGEL  
1,514,275  
APPARATUS FOR PROJECTING ADVERTISEMENTS UPON AND THROUGH A SCREEN  
Filed July 28, 1922
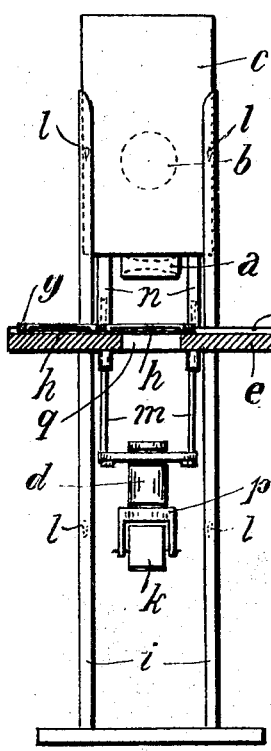
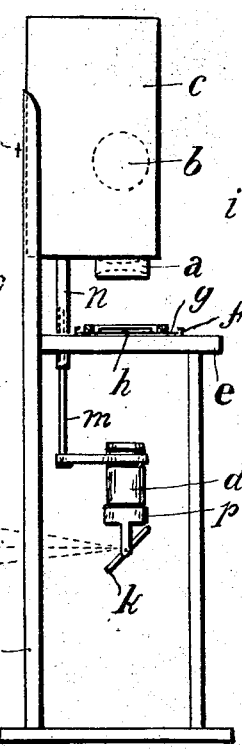
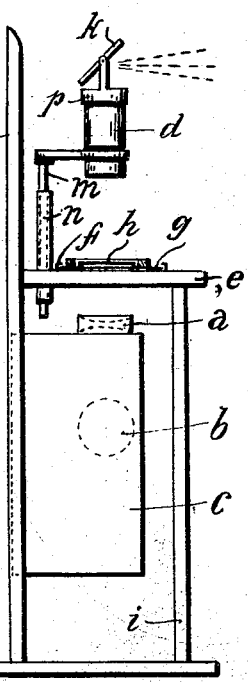
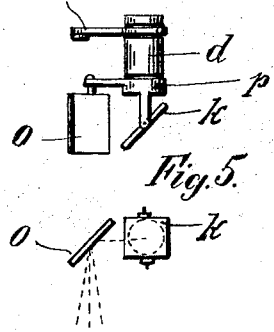

Patented Nov. 4, 1924.

1,514,275

UNITED STATES PATENT OFFICE.

ADOLF WEIGEL, OF BERLIN, GERMANY.

APPARATUS FOR PROJECTING ADVERTISEMENTS UPON AND THROUGH A SCREEN.

Application filed July 28, 1922. Serial No. 578,166.

*To all whom it may concern:*

Be it known that I, ADOLF WEIGEL, a citizen of the German Republic, and residing at Berlin, Germany, have invented certain new and useful Improvements in Apparatus for Projecting Advertisements Upon and Through a Screen, of which the following is a specification.

This invention relates to an improved apparatus for projecting advertisements, which is so designed that the advertisements can be projected upon as well as through a screen. The apparatus is to be used for such projections, in which the advertisement is produced on the advertisement plate during the projection only. In the to and through projection of such advertisements, it is necessary that the position of the advertisement plate remains unaltered, because the advertisement on the plate must be worked, delineated or drawn during the projection. For this purpose, the advertisement plate is located in horizontal position.

The apparatus comprises a perpendicular frame, on which the single parts of the same are mounted. The light source is arranged in a casing, to which also the condenser is attached. The advertisement plate is immovably but interchangeably located on a table of said frame above a light passage opening. The casing with the light source and the condenser is detachably suspended from said frame and can be mounted at will above or below the advertisement plate; of course, always in such a position that the condenser faces the advertisement plate. The lens is also detachable and reversible and can be arranged above or below the advertisement plate. The reversibility of the condenser and light source, and of the lens respectively, permits of the advertisement being projected either upon, or through the screen.

With the casing, light source and condenser suspended above the advertisement plate and the lens located below the latter, the apparatus is fit for projecting the advertisement through the screen. A mirror on the lens serves for reflecting the light rays upon the screen.

For projecting the advertisement upon the screen, the casing with light source and condenser is suspended below the advertisement plate and the lens located above the latter.

The apparatus can also be used for to and through projection without reversing the casing and lens, for which purpose another mirror is provided laterally to the reflecting mirror on the lens, whereby, however, a great loss of light would be produced. Furthermore, prisms may be provided for using the apparatus for to and through projection without reversing the casing and lens, which arrangement is, however, also inconvenient in view of the great loss of light and the unclearness of the picture produced.

The accompanying drawing shows the subject matter of the present invention:

Fig. 1 is a front view of the apparatus, with the light source and condenser arranged above and the lens below the advertisement plate;

Fig. 2 is a side view of Fig. 1;

Fig. 3 is a side view of the apparatus, with the lens arranged above and the light source and condenser below the advertisement plate;

Fig. 4 is a side view of the lens in the position shown in Figs. 1 and 2, with a second laterally located mirror; and Fig. 5 is a plan view of Fig. 4.

The light source $b$ is arranged in a casing $c$, to which also the condenser $a$ is attached. The casing $c$ is detachably suspended from a hook $l$ of the frame $i$ of the apparatus. Said frame has a table $e$ with a light passage opening $q$, on which two advertisement plates $h$ can be placed at a time, one of said plates facing always the opening $q$ during the projection. The two advertisement plates $h$ are mounted on a slide $g$, which is mounted in guide-ledges $f$ of the table $e$. The table $e$ carries, further, tubes $n$ for a detachable and adjustable mounting of the lens $d$ by means of rods $m$ located in said tubes. The lens carries on a bracket $p$ a reflecting mirror $k$. The casing $c$ with the light source $b$ and the condenser $a$ can be suspended from the hooks $l$ on the frame $i$ either above or below the advertisement plate $h$, while the lens $d$ with its rods $m$ can be inserted in the tubes $n$ either from below or from above. By said reversibility, the apparatus can be adjusted either for projection of the advertisement through, or upon the screen respectively.

A reversal of the casing $c$ and lens $d$ is not required if a second mirror $o$ is provided on the bracket $p$ laterally to the reflecting mirror $k$. With a provision of the mirror *o* in the position of the apparatus shown in Figs. 1 and 2, the advertisement is projected, instead of through the screen, upon the same. With a provision of the mirror *o* in the position of the apparatus shown in Fig. 3, the advertisement is projected, instead of upon the screen, through the same. Owing to the inavoidable light losses, generally, the provision of the mirror *o* is not recommendable and a reversal of casing *c* and lens *d* is preferred. In special cases, however, for instance if the screen, relatively to the position of the apparatus, is located very high or very low, or if a rapid adjustment of the apparatus from the to projection to the through projection is required, and vice versa, or in cases where the loss of light is immaterial, the provision of a second mirror, instead of a reversal of casing *c* and lens *d*, may be preferable.

What I claim, is:

1. Apparatus for projecting advertisements, comprising, in combination, a table, an advertisement plate on said table upon which the advertisement is produced during the projection, a light source, a condenser, a casing enclosing said light source and carrying said condenser and adapted to be suspended from said table either above or below the advertisement plate, a lens, and means for detachably and adjustably supporting said lens on said table either below or above the advertisement plate, substantially as and for the purpose set forth.

2. In an apparatus as specified in claim 1, a reflecting mirror on said lens, substantially as and for the purpose set forth.

3. In an apparatus as specified in claim 2, a second mirror arranged laterally to said reflecting mirror, substantially as and for the purpose set forth.

In testimony whereof I have hereunto set my hand in the presence of two subscribing witnesses.

ADOLPH WEIGEL.

Witnesses:
E. HOLZERMANN,
WILHELM AHNSTROM.